(12) United States Patent
Stodt et al.

(10) Patent No.: US 9,777,165 B2
(45) Date of Patent: Oct. 3, 2017

(54) PASSIVATING ALKALINE COMPOSITION ON THE BASIS OF WATER GLASS

(71) Applicant: Henkel AG & Co. KGaA, Duesseldorf (DE)

(72) Inventors: Juergen Stodt, Neuss (DE); Michael Wolpers, Erkrath (DE); Marcel Roth, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 133 days.

(21) Appl. No.: 14/662,303

(22) Filed: Mar. 19, 2015

(65) Prior Publication Data

US 2015/0191605 A1    Jul. 9, 2015

Related U.S. Application Data

(63) Continuation of application No. PCT/EP2013/069983, filed on Sep. 25, 2013.

(30) Foreign Application Priority Data

Sep. 28, 2012 (DE) .......................... 10 2012 217 833

(51) Int. Cl.
*C09D 5/08* (2006.01)
*C08K 3/34* (2006.01)
(Continued)

(52) U.S. Cl.
CPC ............... *C09D 5/084* (2013.01); *C08K 3/34* (2013.01); *C09D 1/04* (2013.01); *C09D 5/08* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2011/0283916 A1* | 11/2011 | Bohlander | .............. C01B 33/20 106/14.11 |
| 2013/0295292 A1* | 11/2013 | Bukeikhanova | ......... C09D 5/08 427/420 |

FOREIGN PATENT DOCUMENTS

| | | |
|---|---|---|
| DE | 102011085230 | 5/2012 |
| EP | 0221637 | 5/1987 |

(Continued)

OTHER PUBLICATIONS

International Search Report for PCT/EP2013/069983, mailed Jan. 16, 2014, 2 pages.
(Continued)

*Primary Examiner* — Erma Cameron
(74) *Attorney, Agent, or Firm* — Mary K. Cameron

(57) ABSTRACT

The present invention relates to an alkaline aqueous composition on the basis of water glass and organosilanes with non-hydrolysable substituents which have a primary amino group in the substituents, for providing corrosion-protected coatings on metal surfaces which convey good reshaping properties in metal processing. For the desired functionality, the compositions according to the invention contain the organosilane and the water glass in a predetermined ration. The invention further relates to a method for pre-treating metal surfaces using the alkaline aqueous compositions, which method provides excellent results with regard to corrosion protection, varnish adhesion and reshapability, particularly on aluminum and on steel strips provided with aluminum alloy metal coatings.

17 Claims, 1 Drawing Sheet

(51) Int. Cl.
*C09D 1/04* (2006.01)
*C09D 183/08* (2006.01)
*C23C 22/66* (2006.01)
*C23C 18/12* (2006.01)
*C23C 22/60* (2006.01)
*C08G 77/26* (2006.01)

(52) U.S. Cl.
CPC .......... *C09D 183/08* (2013.01); *C23C 18/122* (2013.01); *C23C 18/1212* (2013.01); *C23C 18/1241* (2013.01); *C23C 18/1295* (2013.01); *C23C 22/60* (2013.01); *C23C 22/66* (2013.01); *C08G 77/26* (2013.01); *C23C 2222/20* (2013.01)

(56) References Cited

FOREIGN PATENT DOCUMENTS

EP 2284234 7/2009
JP 56125464 A 10/1981

OTHER PUBLICATIONS

Jenny Hartmann-Schreier, Wasserglas, Roempp Online, Version 3.31, Copyright 2013 George Thieme Verlag, Cited in German Office Action.

\* cited by examiner

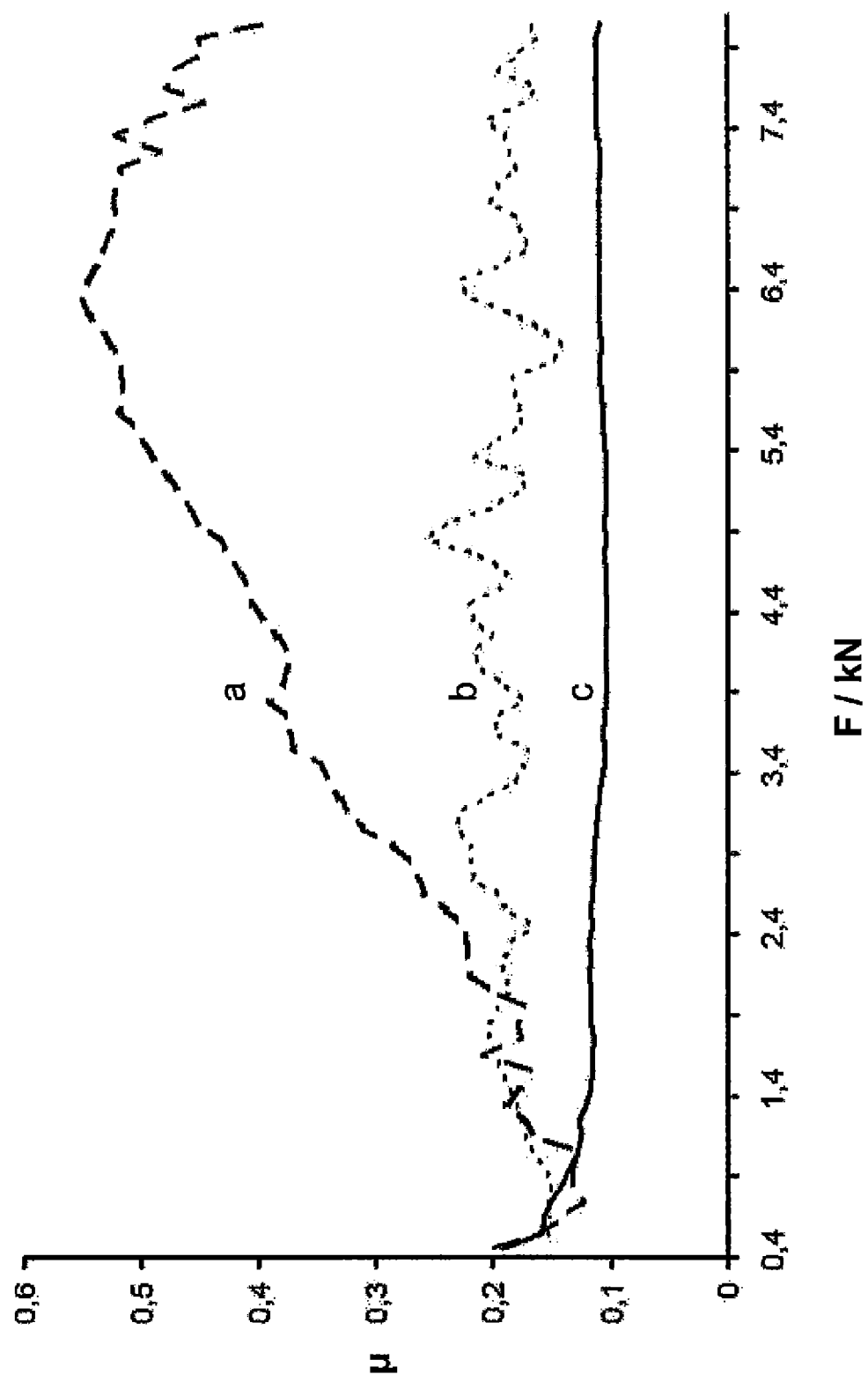

PASSIVATING ALKALINE COMPOSITION ON THE BASIS OF WATER GLASS

The present invention relates to an aqueous alkaline composition on the basis of water glass and organosilanes with non-hydrolyzable substituents, having a primary amino group in the substituent, for providing corrosion-protected coatings on metal surfaces, which impart good reshaping properties in metal working. For the desired functionality, the compositions according to the invention contain the organosilane and the water glass in a predetermined ratio. In addition, the invention relates to a method for pretreatment of metal surfaces using the aqueous alkaline compositions, wherein this method yields excellent results with regard to corrosion prevention, paint adhesion and reshapeability on aluminum in particular, and on a steel strip provided with aluminum alloy metal coatings.

In the production of semifinished metallic products, for example, metal strip, coils or sheet metal, before being stored and shipped to the consumer, they are typically provided with a temporary corrosion protection, which should ensure a high surface quality of the metal strip with the consumer of the semifinished products. The manufacturer of these semifinished products then speaks of shipping protection in application of a corrosion-preventing coating. In particular in the case of hot-dip coated metal strips having an alloy component of aluminum in the metallic coating, the filiform corrosion that is promoted by variable weather conditions during storage of the metal strips is to be suppressed effectively.

However, the shipping protection is not limited just to preserving the surface quality of the semifinished metallic product during storage and shipping and thus suppressing corrosion phenomena, but instead the shipping protection should be compatible with the finishing steps to be performed by the consumer, who is in turn a manufacturer of components and should at best be finished so that fabrication steps are facilitated or eliminated.

This is true to a particular extent for reshaping operations to be performed by the consumer, on the one hand, for example, profiling or deep drawing and, on the other hand, for a cleaning of the metal surfaces, which takes place following reshaping but before coating with an organic primer or powder coating. The semifinished metallic product is thus wetted with a metal-working fluid to protect the metal surfaces and the reshaping tools when being reshaped by the manufacturer of components, wherein the compatibility with the shipping production must be given in order to achieve a low coefficient of friction in profiling or in deep drawing.

In addition, the manufacturer of the components wishes that the temporary corrosion prevention is preserved as much as possible after cleaning the polished or deep-drawn semifinished products for removal of the metal-working fluid, and in addition, the temporary corrosion prevention forms a good adhesive base for application of an organic primer or powder coating, so that a pretreatment step on the part of the manufacturer of the components may be omitted.

A variety of pretreatment methods for semifinished products which supply suitable coatings for shipping protection are known in the prior art.

WO 00146310 discloses an improvement in the corrosion protection of metal surfaces by applying water-based compositions, which are a mixture of condensable amino-substituted silanes and polysilanes, to the metal surfaces, and drying them.

The subject matter of JP 56125464 is the design of wear-resistant coatings on metal surfaces with the help of silane-based compositions and discloses compositions containing epoxide-substituted silanes having a high surface hardness as the hardened coating. The skilled person will learn from JP 56125464 that additional amounts of polydiols in the compositions described there will reduce surface hardness and increase the elasticity of the coating on metal surfaces.

EP 2284234 A1 discloses a first corrosion protection pretreatment of metal strip surfaces on the basis of condensable organosilanes, which also ensure the reshapeability of the cold strip, in particular in deep-drawing processes without applying additional agents. Compositions containing a mixture of organosilanes consisting at least partially of aminosilanes as well as polyether diols, polyester diols and/or polycarbonate diols, which necessarily contain a large amount of highly volatile alcohol, are disclosed for this purpose.

EP 221637 discloses corrosion-resistant thin coatings on the basis of water glass and organosilanes, which are suitable in particular as a high-temperature coating, wherein the application solutions contain a small amount of volatile organic compounds.

Despite the extensive prior art, on the one hand, regarding corrosion-protective pretreatments, which impart good shipping protection for semifinished metallic products, and, on the other hand, regarding pretreatments that form coatings, which have a good reshapeability in processing of semifinished metallic products, there are few known pretreatments which provide both excellent protection during shipping and also meet the requirements of the manufactures of metallic component regarding compatibility and functionality of the pretreated semifinished products.

The object of the present invention is thus to develop a composition for pretreatment on semifinished metallic products, which imparts an excellent corrosion protection for storage and shipping of the semifinished products as well as for the finished coated component. For this purpose, the corrosion-protective coating applied in the pretreatment must survive the finishing steps of the manufacturer of the components largely without being damaged and must have, for example, a high alkalinity stability in order not to be attacked itself in the removal of metal-working fluids using alkaline cleaner systems. At the same time, the corrosion protection pretreated semifinished products with a corrosion protection coating should have a good adhesive base for coating with an organic primer or a powder coating. In corrosion prevention, it is particularly important to ensure that the filiform corrosion of semifinished products made of aluminum or of semifinished products having aluminum alloy coatings can be adequately suppressed on the basis of pretreatment with the compositions according to the invention. Furthermore, a composition according to the invention must form coatings on the semifinished products that are compatible with the fabrication processes used by the manufacturer of the components and must maximally support semifinished product reshaping operations, for example, in the profiling or deep-drawing. This means in particular that semifinished metallic products pretreated with the compositions according to the invention must permit the lowest possible coefficient of friction after being exposed to water-based metal-working fluids.

BRIEF DESCRIPTION OF THE DRAWING

The FIGURE shows a graph comparing test results of the coefficient of sliding friction determined in a strip tensile test as a function of the clamping force for three samples: Curve "a" represents a comparative coating, Example No. 2; Curve "b" represents an untreated steel plate; and Curve "c" represents a composition according to the invention.

In addition, a composition according to the invention should be specifically suited for application as a liquid film to the semifinished metallic product, in particular to metal strip, and dried ("dry-in-place" method) in conventional application methods.

This spectrum of objects is achieved by means of an alkaline water-based composition for pretreatment of semifinished metallic products containing:
a) water glass in a molar ratio of $SiO_2$ to $M_2O$ of at least 3:2 but no more than 7:1, where M is selected from alkali metals and/or quaternary ammonium compounds;
b) one or more organosilanes (A), each of which has at least one hydrolyzable substituent, which is split off in hydrolysis as an alcohol having a boiling point below 100° C. at an atmospheric pressure of 1 bar, and which have one to three non-hydrolyzable substituents on the respective silicon atom, these substituents having at least one primary amino group, wherein the total number of substituents on the respective silicon atoms of the organosilanes (A) is four, wherein the molar ratio of primary amino groups of the organosilanes (A) to the total amount of silicon atoms from water glass and organosilanes having at least one hydrolyzable substituent each amounts to at least 0.14 but no more than 0.3.

The term "semifinished metallic product" is interpreted more broadly within the scope of the invention than the sum of the semifinished products known in the prior art, such as sheet metal, metal coil or metal strip and describes all metallic objects which are usually subjected to a reshaping operation to yield a corresponding metallic component.

Organosilanes in the sense of the present invention have at least one covalent Si—C bond by means of which a so-called "non-hydrolyzable substituent" is bound to the silicon atom.

If the compositions according to the invention are applied directly to semifinished metallic products and dried, then coatings that have excellent reshaping properties and very good compatibility with conventional water-based metalworking fluids, while also providing protection against corrosion are obtained. Furthermore, very good adhesion-imparting properties of the coating that protects against corrosion to organic primer coatings that are applied subsequently are obtained, wherein coatings on semifinished products having aluminum alloy metal surfaces or on aluminum products, which are in turn coated with organic primers or powder coatings, have a low tendency to develop filiform corrosion.

It has surprisingly been found that a relatively large amount of organosilanes with primary amino groups relative to the total amount of water glass and such organosilanes that have at least one hydrolyzable substituent each are necessary for a good reshapeability of the semifinished metallic products in the fabrication of components. It has thus been found that when the predetermined relative amount of organosilanes having primary amino groups is lower than the predetermined relative amount, aluminum alloy metal surfaces or aluminum surfaces may be adequately passivated, but then the reshapeability of the applied and dried coatings based on alkaline water-based compositions according to the type of the present invention is inadequate. Conversely, when there is an increase in the relative amount above the amount predetermined according to the invention, there is a definite exacerbation of the passivation effect, so that the corrosion-preventing properties of such coatings on metallic components, in particular on components made of aluminum alloy metals or consisting of aluminum are inadequate.

In this context, for an excellent reshapeability of semifinished metallic products, such compositions according to the invention, for which the molar ratio of primary amino groups of the organosilanes to the total amount of silicon atoms from water glass and organosilanes, each having at least one hydrolyzable substituent, is at least 0.16, especially preferably at least 0.18, but preferably no more than 0.26, especially preferably no more than 0.22, are preferred for the production of corrosion protective coatings on semifinished metallic products.

For a good processability of the compositions according to the invention and adequate condensation of the inorganic silicates with the organic silanes, it is preferable for the molar ratio of silicon from water glass to silicon from organosilanes, each having at least one hydrolyzable substituent, to be no lower than 2, especially preferably no lower than 2.5 and preferably no more than 6, especially preferably no more than 5. If the relative amount of organic silanes is too high, the viscosity of the composition according to the invention may increase to the extent that application of the same using application methods that are typical with paints becomes problematical. Conversely, if the relative amounts or organic silanes are too low, the resulting crosslinking of the inorganic silicates may be too low, which in turn has negative effects on the corrosion-protective properties of layer coatings produced with the composition on metallic components.

The amount of organosilanes (A) in the composition according to the invention is preferably very high on the basis of the total amount of organosilanes having at least one hydrolyzable substituent each in order to be able to impart the desired properties as a dried coating to metals, i.e., a very good corrosion protection and paint adhesion with excellent reshapeability. Therefore, the preferred compositions according to the invention are those for which the molar ratio of silicon from organosilanes (A) to silicon from organosilanes, where each has at least one hydrolyzable substituent, is no less than 0.8, especially preferably no less than 0.9.

The corrosion protection properties and the paint adhesion to subsequently applied organic primer coatings can be further improved if the compositions according to the invention applied to the metallic surfaces and dried contain such organosilanes (A) that have several amino groups in the non-hydrolyzable substituents, wherein the ratio of primary to secondary and tertiary amino groups is no greater than 0.8, preferably no greater than 0.5.

In addition, in this context, the preferred compositions according to the invention are those containing organosilanes (A), each having at least one non-hydrolyzable substituent, which has a polyalkyleneamine unit with at least two amino groups, especially preferably with at least three amino groups wherein the alkylene units preferably consist of no more than five carbon atoms, in particular preferably no more than four carbon atoms.

The hydrolyzable substituents of the organosilanes (A) split off alcohols in condensation and/or hydrolysis, these alcohols having a boiling point of 100° C. at an atmospheric pressure of 1 bar in the compositions according to the invention. In preferred embodiments, the hydrolyzable substituents of the organosilanes (A) of the compositions according to the invention are therefore selected from methoxy groups, ethoxy groups and/or propoxy groups, in particular from methoxy groups.

Especially suitable representatives of the organosilanes (A) in compositions according to the invention for producing corrosion-protection coatings on aluminum alloy metal surfaces and on aluminum surfaces are selected from aminosilanes having the general structural formula (I):

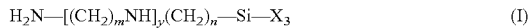

$$H_2N-[(CH_2)_m NH]_y(CH_2)_n-Si-X_3 \quad (I)$$

where the substituents X are each selected independently of one another from alkoxy groups with no more than four carbon atoms, preferably no more than two carbon atoms, where m and n, each independently of one another, stand for integers in the range of 1 to 4, and y is an integer in the range of 0 to 8, preferably in the range of 1 to 5. Preferred representatives of the organosilanes (A) according to the general structural formula (I) include 3-(diethylenetriamino) propyltrimethoxysilane, 3-(ethylenediamino)propyltrimethoxysilane, 3-aminopropyltrimethoxysilane, 3-(diethylenetriamino)propyltriethoxysilane, 3-(ethylenediamino) propyltriethoxysilane and 3-aminopropyltriethoxysilane, especially preferably 3-(diethylenetriamino)propyltrimethoxysilane.

In addition, small amounts of crosslinking polynuclear organosilanes can improve the corrosion resistance of coatings on the basis of compositions according to the invention without having a negative effect on the reshapeability of metallic compounds coated in this way. Thus, in a preferred composition according to the invention, at least binuclear organosilanes, in which the silyl units each have at least two hydrolyzable substituents and are connected to one another by means of at least one non-hydrolyzable dialkyleneamine unit, may also be present in a preferred composition according to the invention; the dialkyleneamine unit especially preferably consists of no more than 10 carbon atoms. Preferred representatives of these polynuclear organosilanes include bis(3-triethoxysilylpropyl)amine, bis(3-trimethoxysilylpropyl)amine.

The water glasses contained in the compositions according to the invention are vitreous, i.e., amorphous, water-soluble silicates solidified from a melt or the aqueous solutions thereof. The preferred water glasses in the compositions according to the invention are those in which the molar ratio of $SiO_2$ to $M_2O$ amounts to at least 5:2, but preferably is no greater than 5:1, where M is selected from alkali metals and/or quaternary ammonium compounds, especially preferably from potassium and/or sodium.

Aluminum salts may additionally be present in the composition according to the invention to further improve the blank corrosion protection, which is crucial for protection in shipping, preferably those aluminum salts, which are not a source of halide ions, especially preferably aluminate, for example, $NaAl(OH)_4$. The blank corrosion protection is increased on electrolytically galvanized steel strip in particular, but also, to a somewhat lesser extent, on steel strip that has been hot-dip galvanized.

The composition according to the invention may also contain additional silanes in addition to the organosilanes, each having at least one hydrolyzable substituent. It is preferable in this context that the compositions according to the invention contain no more than 0.2% by weight silane, on the basis of the element Si, having four hydrolyzable substituents, because such silanes greatly increase the crosslinking of the organosilanes with the water glass, so that stable or applicable compositions are not obtained with larger amounts of these silanes.

The pH of the compositions according to the invention is preferably in the range of 9 to 13, especially preferably in the range of 10 to 12.

The invention also relates to a water-based concentrate, which yields a ready-to-use composition according to the invention by diluting with water by a factor of up to 20.

Such a concentrate, which is also according to the invention, contains:

a) 15-50% by weight, on the basis of $SiO_2$, of water glass with a molar ratio of $SiO_2$ to $M_2O$ of at least 3:2 but no more than 7:1, where M is selected from alkali metals and/or quaternary ammonium compounds;

b) 2-20% by weight, on the basis of the element silicon, of organosilanes (A) each having at least one hydrolyzable substituent, which is split off by hydrolysis as an alcohol having a boiling point below 100° C. and which has one to three non-hydrolyzable substituents on the respective silicon atom, these substituents having at least one primary amino group, wherein the total number of substituents on the respective silicon atoms of the organosilanes (A) is four;

c) no more than 5% by weight, on the basis of the element silicon, of organosilanes, each having at least one hydrolyzable substituent but none of them being organosilanes (A);

d) no more than 1% by weight, on the basis of the element silicon, of organosilanes with such hydrolyzable substituents that split off hydrogen halides when hydrolyzed;

e) no more than 1% by weight, on the basis of the element aluminum, of water-soluble aluminum salts;

f) no more than 0.2% by weight, on the basis of the element silicon, of silanes each having four hydrolyzable substituents, wherein the molar ratio of primary amino groups of the organosilanes to silicon atoms from water glass and organosilanes, each having at least one hydrolyzable substituent, amounts to at least 0.14 but no more than 0.3.

For the components of the water-based concentrate according to the invention, the aforementioned preferred embodiments also apply accordingly with regard to the alkaline water-based composition according to the invention.

Concentrates according to the invention are preferably obtainable by adding the corresponding amount of the organosilanes (A) and optionally other organosilanes, which are not organosilanes (A), to a clear solution of at least 15% by weight water glass, calculated as $SiO_2$, and containing water, wherein the mixture containing water is stirred at a temperature of 30-60° C. after adding the amount of organosilanes until a clear solution is again obtained. It is a clear solution when the turbidity value (NTU) measured according to DIN ISO 7027 at a wavelength of 860 nm is below 50 in the light scatter method at a temperature of the solution of 30° C.

In particular the concentrates according to the invention can be obtained by heating the water-containing mixture after adding the organosilanes as long as and optionally being exposed to a reduced pressure until the amount of such alcohols that have a boiling point below 100° C. at an atmospheric pressure of 1 bar is below 1 g/L, especially preferably below 100 ppm.

The present invention also includes a method for pretreatment of semifinished metallic products before reshaping them to form a metallic component and coating same with an organic primer in which at least a portion of the metal surfaces of the semifinished product are brought in contact with a composition according to the invention, preferably with a concentrate according to the invention diluted in water, so that such a liquid film results on this part of the metal surfaces of the semifinished product that supplies a coating layer to this part of the metal surfaces, on the basis of the element silicon, of at least 5 mg/m$^2$, preferably at least 20 mg/m$^2$ but preferably no more than 300 mg/m$^2$, especially preferably no more than 100 mg/m$^2$, on the basis of the element silicon.

Suitable application methods are known from the prior art in general and include in particular roller application methods, spray and dip applications.

The liquid film applied to the metal surface of the semifinished product is preferably dried at a peak metal temperature (PMT) in the range of 30-200° C., especially preferably 30-100° C. IR radiation is also suitable for the drying, so that drying can be performed successfully even at a lower PMT.

Semifinished metallic products pretreated by the method according to the invention can be reshaped easily, i.e., with minimal wear on the reshaping tools, for example, in a press mill to form the component before any further coating with an organic primer, without a significant negative effect due to an optional prior cleaning of the semifinished product with an alkaline cleaning agent or without any significant negative effect of the reshaping operation itself on the corrosion-resistant effect of the coating.

Therefore, according to the invention, methods in which a reshaping operation is carried out after applying the liquid film of the composition according to the invention, preferably the concentrate according to the invention diluted with water, and after drying of same but before any further coating with an organic primer.

In general it has been found that corrosion protection and paint adhesion of the coatings applied to the semifinished products in the method according to the invention as well as the properties of the coating in reshaping to form the component are improved especially significantly when the metal surfaces of the semifinished products have a coating layer of aluminum of at least 10 mg/m$^2$, preferably at least 20 mg/m$^2$ on the basis of the element aluminum and determined by wet chemical methods so that a method according to the invention using such semifinished metallic products is preferred. The coating layer is determined by a wet chemical method by immersing the metal surfaces of the semifinished product in a 1N sodium hydroxide solution at 60° C. for 10 seconds, wherein the sheet metal is rinsed with deionized water after being removed from the sodium hydroxide solution, so that the rinse water dripping off of the semifinished product enters the sodium hydroxide solution. After determining the total volume of sodium hydroxide solution, a defined specimen volume is removed and the aluminum content in the specimen volume is then determined by using inductively coupled argon plasma in optical emission spectroscopy (ICP-OES) and extrapolated to the total volume and standardized to the total surface area to determine the coating layer on the total surface of the semifinished metallic product.

The method according to the invention is thus excellently suited for pretreatment of semifinished products of aluminum and its alloys or semifinished products of steel provided with aluminum alloy metal coatings. Semifinished products made of steel provided with aluminum alloy metal coatings suitable for the method according to the invention include in particular hot-dip coated strip steel and flame galvanized strip steel (Z), zinc-magnesium-aluminum strip steel (ZM), Galfan (ZA), Galvalume (AZ) and flame-aluminized strip steel (AS), but flame-galvanized strip steel (Z) and Galvalume (AZ) are especially preferred. In the method according to the invention, coatings that impart a very good corrosion protection and paint adhesion to subsequently applied organic primer coatings and also impart an excellent reshapability in the production of the corresponding components are produced on the selected semifinished metallic products by the method according to the invention.

A particularly preferred method according to the invention for producing surface-treated components of hot-dip coated strip steel includes the following successive steps a)-e):

a) Bringing the hot-dip coated strip steel in contact with a composition according to the invention or with a concentrate according to the invention that is diluted with water, so that such a liquid film results on the hot-dip coated strip steel, which supplies a layer coating on the basis of the element silicon of at least 5 mg/m$^2$, preferably at least 20 mg/m$^2$, but preferably no more than 300 mg/m$^2$, especially preferably no more than 100 mg/m$^2$ after drying, preferably at an elevated temperature;

b) Applying a water-miscible metal-working liquid to the hot-dip coated strip steel;

c) Reshaping, preferably profiling, the hot-dip coated strip steel to form the component;

d) Cleaning the component, preferably with a water-based neutral or alkaline cleaning agent;

e) Applying an organic primer or powder coating to the component.

Hot-dip-coated strip steel preferably has a layer weight, on the basis of the element aluminum, of at least 10 mg/m$^2$, especially preferably at least 20 mg/m$^2$, determined by a wet chemical method in this process sequence.

Water-miscible metal-working fluids are oil-in-water emulsions in particular.

Between the individual steps a) and e), additional rinsing steps and cleaning steps may be provided and a passivating pretreatment with an aqueous composition on the basis of a wet chemical method may be performed in addition between steps d) and e).

EXEMPLARY EMBODIMENTS

Various hot-dip galvanized steel plates were pretreated with aqueous alkaline compositions according to Table 1 by first applying a liquid film by means of a pinch coater and then drying it at 40° C. A layer weight of 50-60 mg/m$^2$, on the basis of the element silicon, was adjusted in this way on the basis of the liquid film thickness. The layer weight was determined by means of x-ray analysis (RFA).

The metal sheets pretreated in this way were subjected to a blank corrosion test according to DIN EN ISO 9227.

Other metal sheets were provided with a polyester-based powder coating (TIGER Coatings) immediately after applying the coating by means of the alkaline compositions. In doing so, a paint layer thickness of 80 μm was set. The metal sheets coated with the powder coating were subjected to a condensed water climate test and then provided with an Erichsen cupping. The cross-hatch paint adhesion test over the indentation was determined according to DIN EN ISO 2409.

TABLE 1

Corrosion results in the blank corrosion and paint adhesion after powder coating of coatings applied by means of various alkaline compositions to hot-dip galvanized steel plates (TKS, Beeckerwerh FBA4)

| No. | $M_2O \cdot SiO_2$ [1] % by wt $SiO_2$ | Silane % by wt | $NH_2/Si$ * | SST ** % | Cross hatch *** 0-5 |
|---|---|---|---|---|---|
| 1 | 20.9 | — | n.d. | 50-80 | 5 |
| 2 | 20.9 | 5 | 0.05 | 5 | 1-2 |
| 3 | 20.9 | 18 | 0.16 | 1 | 0 |
| 4 | — | 95% [2] | n.d. | 30-60 | 4 |

[1] Potassium water glass 28/30 (8.1% by weight $K_2O$; 20.9% by weight $SiO_2$)
[2] Remaining 5% by weight = 10% $NH_3$ solution
* Molar ratio of primary amino groups to silicon from water glass and silane
** Salt spray test for 48 hours according to DIN EN ISO 9227; evaluation of the proportion of surface area with white rust
*** Storage for 3 days in water of condensation climate test according to DIN EN ISO 6270-2 CH and then evaluation of the paint adhesion in the grid cut according to DIN EN ISO 2409 according to Erichsen cupping (6 mm)

It can be deduced from Table 1 that a composition according to the invention (Example No. 3) yielded the best test results in blank corrosion and also with regard to paint adhesion. However, alkaline compositions containing water glass and aminosilane in a quantity ratio not according to the invention (Example No. 2) failed in both test methods. The synergistic effect of alkaline compositions containing a mixture of water glass and aminosilanes is apparent in a comparison with alkaline compositions containing either water glass (Example No. 1) or aminosilane (Example No. 4).

In addition, sheet metal plates having coatings with the compositions according to examples Nos. 2 and 3 with a layer weight of 50-60 mg/m², on the basis of the element silicon, were measured with respect to their tribological behavior in the strip tensile test. To do so, the metal sheets were wetted with a metal-working fluid (Multan ES 184 B; Henkel AG & Co. KGaA) and clamped between two flat metal jaws. The metal plates were moved out of clamping by the metal jaws with a steady action of force at a constant rate in the clamping direction, and the force required to do so was measured.

The FIGURE shows the coefficient of sliding friction determined in the strip tensile test as a function of the clamping force.

It is clear that a composition according to the invention (Example No. 3, curve c in the FIGURE) produces an almost constant low coefficient of sliding friction as a coating on the steel plates; this coefficient is almost consistently low over the measured range of tensile force and thus imparts good reshaping properties in profiling the metal sheet, for example. The compatibility of the pretreatment with reshaping operations in component fabrication is thus given on the basis of a composition according to the invention. For a composition not according to the invention (Example No. 2, curve a in the FIGURE) as the coating, a definite increase in the coefficient of sliding friction is achieved with an increase in tensile force, so that such coatings in metal working present a higher resistance in opposition and cause greater damage to the surfaces of the steel strip and the reshaping tools in reshaping. Entirely untreated steel plates (curve b in the FIGURE) also have a higher sliding friction resistance than steel plates treated according to the invention, wherein periodic instabilities also occur and cause a substantial wear on tools in reshaping, despite the relatively low coefficient of friction.

What is claimed is:

1. An alkaline water-based composition containing
   a) water glass having a molar ratio of $SiO_2$ to $M_2O$ of at least 3:2 but no more than 7:1, where M is selected from alkali metals and/or quaternary ammonium compounds;
   b) one or more organosilanes (A), each of which has: i) at least one hydrolyzable substituent, which is split off in hydrolysis as an alcohol having a boiling point below 100° C. at an atmospheric pressure of 1 bar; and ii) one to three non-hydrolyzable substituents on the respective silicon atom, said one to three non-hydrolyzable substituents having at least one primary amino group, wherein the total number of substituents on the respective silicon atoms of the one or more organosilanes (A) is four, and
   c) optionally, other organosilanes having at least one hydrolyzable substituent, which are not organosilanes (A),
   wherein the molar ratio of primary amino groups of the one or more organosilanes (A) to the total amount of silicon atoms from water glass and total present organosilanes each having at least one hydrolyzable substituent amounts to at least 0.14:1, but no more than 0.3:1.

2. The composition according to claim 1, wherein the molar ratio of primary amino groups of the one or more organosilanes (A) to the total amount of silicon atoms from water glass and the total present organosilanes, each having at least one hydrolyzable substituent, amounts to at least 0.16:1, but no more than 0.26:1.

3. The composition according to claim 2, wherein the molar ratio of primary amino groups of the one or more organosilanes (A) to the total amount of silicon atoms from water glass and the total present organosilanes, each having at least one hydrolyzable substituent, amounts to at least 0.18:1, but no more than 0.22:1.

4. The composition according to claim 3, wherein the one or more organosilanes (A) have a plurality of amino groups in the non-hydrolyzable substituents, wherein the molar ratio of primary amino groups:(secondary amino+tertiary amino) groups is no greater than 0.5:1.

5. The composition according to claim 4, wherein the one or more organosilanes (A) each contain at least one non-hydrolyzable substituent, which has a polyalkyleneamine unit with at least two amino groups, wherein alkylene units of the polyalkyleneamine consist of no more than four carbon atoms.

6. The composition according to claim 5, wherein the molar ratio of silicon from water glass to silicon from the total present organosilanes each having at least one hydrolyzable substituent is no less than 2.5:1, and no greater than 5:1.

7. The composition according to claim 6, wherein the molar ratio of silicon from the one or more organosilanes (A) to silicon from the total present organosilanes, each having at least one hydrolyzable substituent, is no less than 0.9:1.

8. The composition according to claim 7 having a pH of 10 to 12.

9. The composition according to claim 1, wherein the one or more organosilanes (A) have a plurality of amino groups in the non-hydrolyzable substituents, wherein the molar ratio of primary amino groups:(secondary amino+tertiary amino) groups is no greater than 0.8:1.

10. The composition according to claim 9, wherein the one or more organosilanes (A) each contain at least one non-hydrolyzable substituent, which has a polyalkyleneamine unit with at least two amino groups, wherein alkylene units of the polyalkyleneamine consist of no more than five carbon atoms.

11. The composition according to claim 9, wherein the one or more organosilanes (A) are selected from aminosilanes with the general structural formula (I):

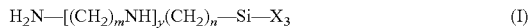
$$H_2N\text{—}[(CH_2)_m NH]_y (CH_2)_n\text{—}Si\text{—}X_3 \quad (I)$$

where the substituents X, independently of one another are selected from alkoxy groups with no more than four carbon atoms,
wherein m and n each independently of one another are integers in a range of 1-4, and y is an integer in a range of 0-8.

12. The composition according to claim 1, wherein the molar ratio of silicon from water glass to silicon from the total present organosilanes each having at least one hydrolyzable substituent is no less than 2:1, and no greater than 6:1.

13. The composition according to claim 1, wherein the molar ratio of silicon from the one or more organosilanes (A) to silicon from the total present organosilanes, each having at least one hydrolyzable substituent, is no less than 0.8:1.

14. A water-based concentrate, containing:
a) 15-50% by weight on the basis of $SiO_2$ of water glass with a molar ratio of $SiO_2$ to $M_2O$ of at least 3:2 but no more than 7:1, where M is selected from alkali metals and/or quaternary ammonium compounds;
b) 2-20% by weight on the basis of the element silicon of organosilanes (A), each having i) at least one hydrolyzable substituent, which is split off in hydrolysis as an alcohol having a boiling point of less than 100° C., and ii) one to three non-hydrolyzable substituents on the respective silicon atom, each substituent having at least one primary amino group, wherein the total number of substituents on the respective silicon atoms of the organosilanes (A) is four;
c) no more than 5% by weight, on the basis of the element silicon, of organosilanes having at least one hydrolyzable substituent each, but which are not organosilanes (A);
d) no more than 1% by weight, on the basis of the element silicon, of organosilanes having such hydrolyzable substituents which split off hydrogen halides in their hydrolysis;
e) no more than 1% by weight, on the basis of the element aluminum, of water-soluble aluminum salts,
f) no more than 0.2% by weight, on the basis of the element silicon, of silanes each having four hydrolyzable substituents,
wherein the molar ratio of primary amino groups of the organosilanes (A) to silicon atoms from water glass and total organosilanes present each with at least one hydrolyzable substituent amounts to at least 0.14:1 but no more than 0.3:1.

15. A method for pretreating semifinished metallic products before reshaping to form a metallic component and coating of the component with an organic primer, wherein at least one portion of the metal surfaces of the semifinished products is brought in contact with water-diluted concentrate according to claim 8, such that a liquid film that results on the at least one portion of the metal surfaces of the semifinished products supplies a coating layer on the at least one portion of the metal surfaces after drying, on the basis of the element silicon, of at least 5 $mg/m^2$ but no more than 300 $mg/m^2$.

16. The method according to claim 15, wherein the semifinished metallic products are fabricated from aluminum and its alloys or aluminum alloy metal coatings on steel.

17. The composition according to claim 1 having a pH of 10 to 12.

* * * * *